United States Patent
Kuik et al.

(10) Patent No.: US 10,457,570 B2
(45) Date of Patent: Oct. 29, 2019

(54) SYSTEM AND METHOD OF BALLAST WATER TREATMENT WITH CONTINUOUS BIOFOULING CONTROL

(71) Applicant: SEMBCORP MARINE REPAIRS & UPGRADES PTE. LTD., Singapore (SG)

(72) Inventors: Sow Hong Kuik, Singapore (SG); Tee Tank Chew, Singapore (SG); Hwee Hong Chew, Singapore (SG); Chee Yong Chua, Singapore (SG)

(73) Assignee: SEMBCORP MARINE REPAIRS & UPGRADES PTE. LTD., Singapore (SG)

( * ) Notice: Subject to any disclaimer, the term of this patent is extended or adjusted under 35 U.S.C. 154(b) by 742 days.

(21) Appl. No.: 14/424,004

(22) PCT Filed: Aug. 28, 2013

(86) PCT No.: PCT/SG2013/000376
§ 371 (c)(1),
(2) Date: Feb. 25, 2015

(87) PCT Pub. No.: WO2014/035343
PCT Pub. Date: Mar. 6, 2014

(65) Prior Publication Data
US 2015/0183663 A1  Jul. 2, 2015

(30) Foreign Application Priority Data
Aug. 30, 2012  (SG) .................................. 201206460

(51) Int. Cl.
C02F 1/32 (2006.01)

(52) U.S. Cl.
CPC ............ *C02F 1/32* (2013.01); *C02F 2303/04* (2013.01)

(58) Field of Classification Search
None
See application file for complete search history.

(56) References Cited

U.S. PATENT DOCUMENTS

| | | | |
|---|---|---|---|
| 6,403,030 B1 * | 6/2002 | Horton, III | ............... A61L 2/10 210/748.11 |
| 8,524,080 B1 * | 9/2013 | Schuh | ................... C02F 1/4695 204/157.15 |

(Continued)

FOREIGN PATENT DOCUMENTS

| | | |
|---|---|---|
| CN | 202297290 U | 7/2012 |
| WO | 20000078678 A2 | 12/2000 |

(Continued)

OTHER PUBLICATIONS

"Machine Translation of WO2012077958", Han et al., published 2012, 32 total pages.*

(Continued)

*Primary Examiner* — Jonathan M Peo
(74) *Attorney, Agent, or Firm* — Patterson & Sheridan, L.L.P.

(57) ABSTRACT

Embodiments of the invention relate to a ballast water treatment system and method onboard ships or sea-going vessels. The system includes a filtration system, a UV disinfection system and a biofouling control system, which is adapted to provide continuous control of multiplication of marine organisms even during an absence of a ballasting and a de-ballasting process.

18 Claims, 3 Drawing Sheets

(56) References Cited

U.S. PATENT DOCUMENTS

| | | | | |
|---|---|---|---|---|
| 2009/0079706 | A1* | 3/2009 | Mishima | G02F 1/13338 345/173 |
| 2009/0321365 | A1* | 12/2009 | Eriksson | B63J 4/004 210/741 |
| 2010/0310433 | A1* | 12/2010 | Nyberg | C02F 1/001 422/186.3 |
| 2011/0104017 | A1* | 5/2011 | Migliore | C02F 1/002 422/186.3 |
| 2011/0180723 | A1* | 7/2011 | Sasges | A23C 3/07 250/436 |
| 2011/0303532 | A1* | 12/2011 | Foret | A23B 4/015 204/269 |

FOREIGN PATENT DOCUMENTS

| | | | | |
|---|---|---|---|---|
| WO | WO 2004071863 | A1 * | 8/2004 | B08B 17/00 |
| WO | WO-2011029222 | A1 * | 3/2011 | B63B 59/04 |
| WO | 2011064260 | A1 | 6/2011 | |

OTHER PUBLICATIONS

Bakshi et al., "Electromagnetic Fields", Chapter 10, Published by Technical Publications Pune, 3 total pages.*

Howard G. McEntee, "Easily Built Oscilloscope", pp. 72 & 128, Popular Science, May 1937, 5 total pages.*

"Protozoa", Yaeger, "Protozoa: Structure, Classification, Growth, and Development", Medical Microbiology, obtained from Web Nov. 8, 2018, <https://www.ncbi.nlm.nih.gov/books/NBK8325/>, 8 total pages).*

"Cyanobacteria", Madigan et al., "Cyanobacteria", Brock Biology of Microorganisms, obtained from Web Nov. 8, 2018, <http://huey.colorado.edu/cyanobacteria/about/cyanobacteria.php>, 2 total pages.*

International Search Report, PCT/SG2013/000376, dated Oct. 15, 2013.

* cited by examiner

SYSTEM AND METHOD OF BALLAST WATER TREATMENT WITH CONTINUOUS BIOFOULING CONTROL

BACKGROUND

Technical Field

Embodiments of the invention relate to ballast water treatment system and method onboard ships or sea-going vessels, which provide effective and continuous biofouling control by non-chemical processes.

Description of Related Art

Transportation of unwanted marine organisms including micro-organisms by ships' ballast water across the world has upset the ecological balance in many regions. As such, it has become a mandatory requirement by International Maritime Organization (IMO) to control the migration of marine organisms transported by ballast water worldwide especially the undesirable species.

Existing ballast water treatment systems may be broadly classified as treatment involving active substances and treatment without active substances. Treatment involving active substances requires the addition of chemicals to kill marine organisms in the ballast water, however the use of chemicals has negative impact on the environment. Treatment without active substances typically involves physical methods such as ultraviolet (UV) light disinfection and is more desirable due to its minimal impact on the environment. However, treatment without active substances has several major drawbacks including, but not limited to, the following:

1. Conventional UV systems without using active substance have a major drawback of high UV power consumption. Since existing filtration systems are unable to remove all the >50 μm organisms, the UV disinfection systems must use extremely high power to kill all the organisms from micro size bacteria to larger organisms including >50 μm organisms which have passed through the filters.

Furthermore, in high turbidity intake ballast water condition, the high turbidity will shield the effective UV irradiation from the UV light source and hence impede the water treatment efficacy.

As such, very high power consumption will be required by the conventional UV system for ballast water disinfection treatment. In most cases, to cater for the additional UV treatment power demand from the conventional UV ballast water treatment system, installation of additional generator is necessary, especially for ships with high ballasting capacities such as oil tankers, LNG carriers and bulk carriers. In most ships, installing additional generator onboard is not feasible due to space constraints and also economically non-viable. For this reason, many ship owners of large ballast capacity ships are unwilling to employ the more environment friendly UV ballast water treatment.

2. Most existing ballast water treatment systems employ a filtration system to remove larger particles and organisms before the filtered water undergoes UV disinfection. If the backwash water or the back flush water during ballasting process is discharged overboard at the same location where the ballast water was taken from, this will not violate IMO regulations. However, if the water was de-ballasted at another location different from the ballasting location, the back wash water cannot be discharged overboard, due to IMO regulations, as this water is considered to be of foreign origin. Some systems therefore bypass the filtration system but this inevitably compromises the de-ballasting performance. Some other systems increase UV capacity to compensate for the bypassing of filtration system but this further increases power demands. Yet other systems store the back wash water but due to the large volume of back wash water, the ship cargo carrying capacity is significantly reduced.

3. Biofouling is the undesirable accumulation or growth of microorganisms, plants, algae, or animals on wet or submerged artificial structures such as ship hulls and seawater intake pipes, and is a serious problem which can slow ships, block pipes, speed corrosion, and cause damage to the environment. Existing filtration and/or hydrocyclone systems are generally designed for removing particles or living organisms of size greater than 50 μm. However, IMO regulations also require control of living micro-organisms of sizes between 10 μm to 50 μm, which is critical and yet beyond the effective control range of the conventional hydro-cyclone or filter system for ballast water system. Since filtration systems are generally ineffective in removing the organism of sizes between 10 μm to 50 μm, existing ballast water physical treatment systems use UV light to kill living organisms in this size range. However, the 10 μm to 50 μm size organisms are much bigger than the bacteria and the use of UV to kill organisms in this size range will require extremely high power. As a result, the power consumption of UV system in existing ballast water treatment systems is typically very high.

UV light is able to kill or remove marine organisms and bacteria only at the point of contact. Beyond the point of contact, there is no control of the re-growth of the organisms and bacteria.

Living organisms and bacteria populating in submerged surfaces will colonize in biofilm which adhere to these surfaces. Existing UV light and conventional filtration system are unable to remove either the living organisms or the biofilm from these surfaces.

Many existing UV systems employ mercury vapour tubes which produce UV light when bombarded by electrons from the emitters in the tube or by the microwave generated externally which is sent through the magnetron into the tube. The mercury vapour tubes are prone to breakage due to their long-tube construction. In the event of breakage, the mercury vapour will leak into the ballast water and thereby polluting the environment.

Performance of UV light is adversely affected by water turbidity and is therefore much less effective on ships navigating in high turbidity waters.

4. During type approval test for any ballast water treatment system, the test site piping systems are disinfected and bio-fouling is cleansed before commencing the test. Many existing ballast water treatment systems are able to pass the type approval test simply due to the disinfected and cleaned bio-fouling system condition. Subsequently in actual shipboard practice, many of these typed-approved systems would fail the actual shipboard applications performance.

Accordingly, a ballast water treatment system that eliminates the above and other problems of existing systems is highly desired.

SUMMARY

Embodiments of the invention provide a ballast water treatment system and method which are capable of providing biofouling control to meet IMO regulations and yet do not require chemicals or high power consumption.

According to one aspect of the invention, a ballast water treatment system suitable for ballasting and de-ballasting water on ships or sea-going vessels comprises a primary filtration system adapted to remove particles from a ballast water; an organism control treatment system comprising at least one biofouling control (BFC) unit and at least one ultraviolet (UV) disinfection chamber, wherein the UV disinfection chamber includes at least one ultraviolet (UV) lamp adapted to irradiate the filtered ballast water during a ballasting and a de-ballasting process, wherein the BFC unit is disposed at one of the primary filtration system, a first pipe which fluidly connects to or from the primary filtration system, the UV disinfection chamber, and a second pipe which fluidly connects to or from the UV disinfection chamber, and wherein during an absence of the ballasting and the de-ballasting process, the UV lamp of the UV disinfection chamber is adapted to be inactivated and the BFC unit is adapted to at least intermittently generate and propagate through the ballast water a plurality of electromagnetic waves within at least one desired time-varying frequency range to continuously control multiplication of marine organisms in the ballast water and on a plurality of surfaces in contact with the ballast water.

According to another aspect of the invention, a method of treating ballast water onboard ships or sea-going vessels, the method comprising: passing a ballast water through a primary filtration system to remove particles from the ballast water; during a ballasting or a de-ballasting process, disinfecting a filtered ballast water by a combination of ultraviolet (UV) light irradiation and biofouling control; during a ballasting process, receiving the disinfected ballast water into a ballast tank; and during an absence of the ballasting and the de-ballasting process, controlling multiplication of marine organisms in the ballast water and on a plurality of surfaces in contact with the ballast water by at least intermittently generating a plurality of electromagnetic waves within at least one desired time-varying frequency range, and propagating the plurality of electromagnetic waves to at least one of a primary filtration system, a first pipe which fluidly connects to or from the primary filtration system, a UV disinfection chamber, and a second pipe which fluidly connects to or from the UV disinfection chamber.

The above and other features of the embodiments of the invention will be described in greater details in the following paragraphs.

BRIEF DESCRIPTION OF THE DRAWINGS

Embodiments of the invention are disclosed hereinafter with reference to the drawings, in which.

DETAILED DESCRIPTION

In the following description, numerous specific details are set forth in order to provide a thorough understanding of various illustrative embodiments of the invention. It will be understood, however, to one skilled in the art, that embodiments of the invention may be practiced without some or all of these specific details. In other instances, well known process operations have not been described in detail in order not to unnecessarily obscure pertinent aspects of embodiments being described. In the drawings, like reference numerals refer to same or similar functionalities or features throughout the several views.

Ballasting and De-ballasting Processes

Figure 1A:
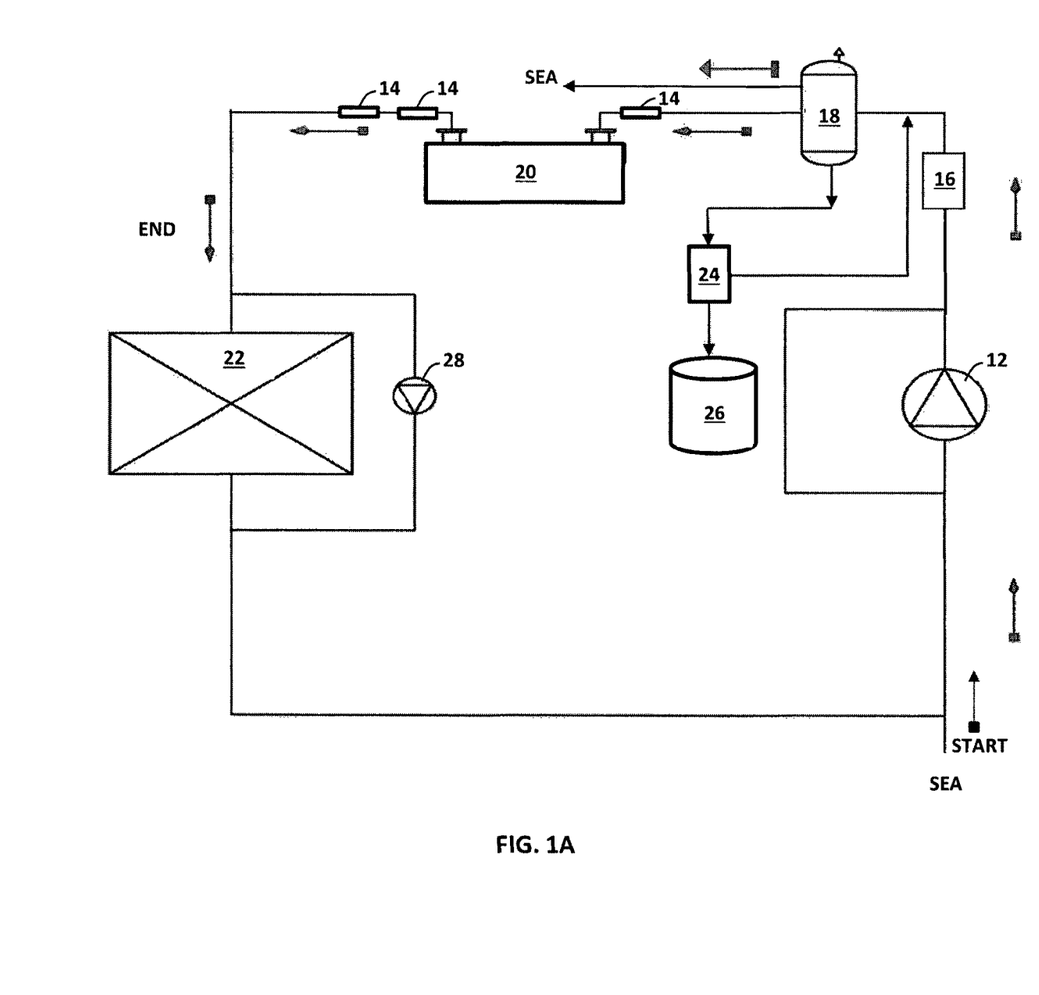
FIG. 1A is a flow diagram illustrating a ballasting process according to one embodiment of the invention.

Reference is made to FIG. 1A illustrating a ballasting process flow according to one embodiment of the invention. During ballasting process, water or seawater drawn from the sea passes through a ballast water treatment system before entering ballast tanks 22 (see arrows in FIG. 1A).

As illustrated in FIG. 1A, water is drawn through a ballast pump 12 or other suitable pumps. This water, i.e. ballast water, may be passed through a ship's existing strainer (not shown). The strainer filters larger particles contained in the ballast water. To prevent the marine organisms from adhering to surfaces of the strainer, the strainer may be protected with biofouling control (BFC) units which will be described in greater detail in later paragraphs.

After passing through the strainer, the ballast water may enter a primary filtration system including, but not limited to, a hydrocyclone 16 and a filter 18. The degree of separation achieved by this hydrocyclone 16 may be 50 μm such that only solid particles greater than 50 μm in size and denser than water are separated out and sedimented. The remaining smaller particles and the ballast water are discharged from the hydrocyclone 16. The use of hydrocyclone 16 is optional in certain embodiments and depends on water quality.

The ballast water then enters one or more filters 18, e.g. automatic back-flush screen filter, whose purpose is to further remove those sedimentary particles and organisms greater than 50 μm if they have not been fully separated out by the hydrocyclone 16 or where a hydrocyclone 16 is not used at all, to reduce turbidity of the ballast water so that UV disinfection treatment in the next stage can be more effective. (Since UV light is reflected by particles, the performance of UV disinfection will be reduced if water turbidity is high.) To prevent the marine organisms from adhering to surfaces of the filter 18, the filter 18 may be protected with BFC units 14 which will be described in greater detail in later paragraphs.

After the filtered ballast water exits from the filter unit 18, the filtered ballast water enters a BFC unit 14 while rejected water is discharged into the sea. The ballast water exiting from the BFC unit 14 then enters a UV disinfection chamber 20. Subsequently, the water exiting from the UV disinfection chamber 20 enters one or more BFC units 14. The use of UV disinfection chamber 20 and BFC units 14 is for the purpose of controlling the number of bacteria and microorganisms in order to meet regulations, e.g. IMO Regulation D-2 Ballast Water Performance Standard, including removing, killing or shocking marine organisms in the ballast water and preventing marine organisms from adhering to surfaces in contact with the ballast water. Subsequently, the disinfected ballast water enters ballast tanks 22 during ballasting process or is discharged overboard during de-ballasting process.

In the above-described process of the invention, the synergistic effect of the BFC units and the UV treatment provides a very high efficacy treatment with very low energy consumption compared with the conventional UV treatment system. For comparable ballast water organism treatment effect, the power consumption using the invention is only 10% to 20% of the conventional UV system. Hence, no additional generator is needed on board the ship and, thus, addresses ship owners' space constraints.

While FIG. 1A shows BFC units 14 being disposed at a first pipe which fluidly connects the filter 18 and the UV chamber 20 to treat the ballast water prior to entering into the UV chamber 20, and at a second pipe which fluidly connects the UV chamber 20 and the ballast tank 22 to treat the ballast water exiting from the UV chamber 20, it is to be appreciated that other placement variations may be envisaged. The number of BFC units being employed and their placement locations within a ballast water piping system may depend on the expected water flow volume, availability of onboard space, and the required treatment efficacy. In some embodiments, one BFC unit may be sufficient in a ballast water treatment system. In some embodiments, the BFC unit(s) may be disposed only at the first pipe to treat the ballast water prior to entering the UV disinfection chamber. In some other embodiments, the BFC unit(s) may be disposed only at the second pipe to treat the ballast water exiting from the UV disinfection chamber. In yet some other embodiments, at least one BFC unit is disposed at each of the first and the second pipe.

Figure 1B:
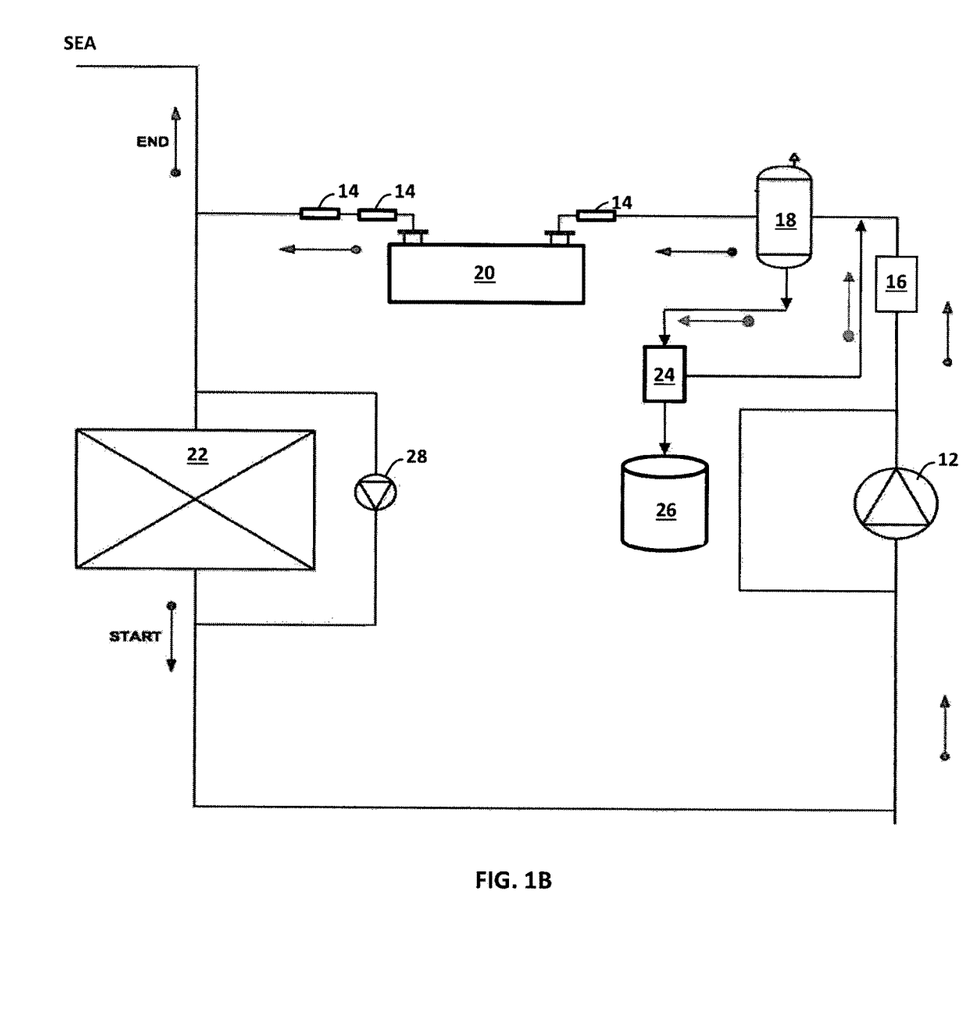
FIG. 1B is a flow diagram illustrating a de-ballasting process according to one embodiment of the invention.

Reference is made to FIG. 1B illustrating a de-ballasting process. During de-ballasting, ballast water drawn from ballast tanks 22 is passed through a ballast water treatment system before being discharged into the sea (see arrows in FIG. 1B). More particularly, ballast water from the ballast tank 22 is passed through the hydrocyclone 16, filter 18, BFC units 14 and UV disinfection chamber 20, and processed in similar ways as described above in relation to the ballasting process.

In addition, a secondary filtration system 24, e.g. waste water concentrator, may be activated during the de-ballasting process. Particularly, rejected water from the primary filtration system, e.g. hydrocyclone 16 and filter 18, is directed to the secondary filtration system 24.

Filtered water from the secondary filtration system 24 may be fed back to the inlet of the filter 18 while the rejected secondary water may be collected and stored in a holding or storage tank 26 or evaporated off. The secondary filtration system will be described in greater detail in later paragraphs.

Figure 1C:
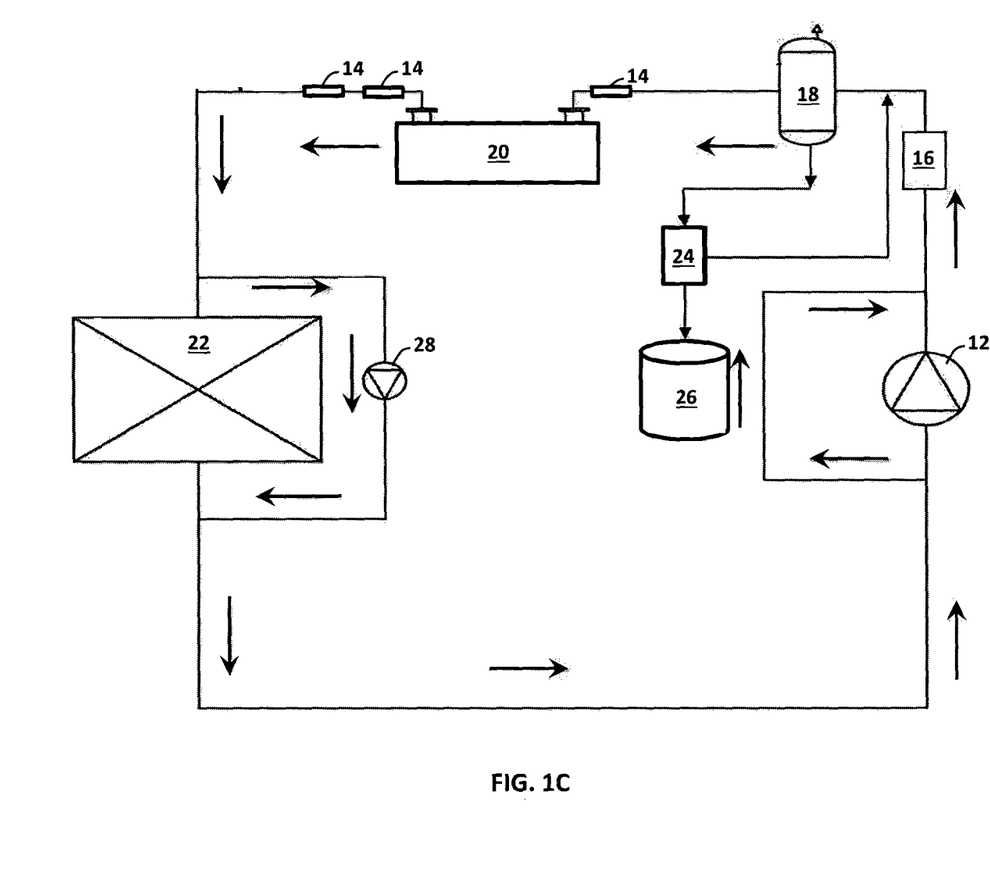
FIG. 1C is a flow diagram illustrating an offline re-circulation process according to one embodiment of the invention.

Reference is made to FIG. 1C illustrating an offline re-circulation process according to one embodiment of the invention wherein ballast water is re-circulated by a re-circulation pump 28. After ballasting or de-ballasting process, the ballast water treatment system may run in re-circulation or offline mode, where only the primary filtration system and BFC unit 14 are activated or in use while the UV disinfection chamber 20 is inactivated or offline. To maintain cleanliness of the surfaces in the ballast water treatment system, holding water in the ballast water pipes will be re-circulated intermittently or continuously through the filter 18, including through the BFC units 14 which are installed at specific locations along the system. This offline mode provides and maintains continuous treatment effect including its residual treatment effect of marine organisms and thereby preventing biofouling and re-growth of marine organisms in the ballast water and on surfaces in contact with the ballast water.

As will be appreciated from the above description, the ballast water treatment system involves the following sub-systems:
(a) a filtration system involving one or more filtration units or steps
(b) a bio-fouling control (BFC) system using BFC units
(c) a disinfection system using ultraviolet light Each of the above sub-systems will be described as follows.

(a) Filtration System

Embodiments of the invention include a primary filtration system and certain embodiments further include a secondary filtration system.

In certain embodiments, the primary filtration system involves multiple filtration units or steps. More particularly, conventional hydrocyclones, cyclone separators, screen filters or disc filters with automatic and/or manual automatic cleaning or back wash system, or combinations thereof may be employed to remove coarse particles and organisms having a size larger than 50 μm from ballast water. Depending on the water quality of the intake ballast water, the filtration screen micron sizes/capacities and the cyclone sizing may be customized accordingly. In general, if the ballast water contains larger and dense particle population, one or more hydrocyclones 16 may be used to lighten the load of the subsequent screen or disc filters. The screen or disc filter filtration size may be selected from mesh size which is in the range of 10 μm to 100 μm, but preferably in the range of 30 μm to 50 μm, to reduce filter equipment foot print and also to avoid excessive water pressure drop.

Using the above separator and/or filtration system in ballast water treatment produces rejected water either from the auto back washing or cleaning system. Such rejected water obtained during de-ballasting process cannot be discharged overboard due to IMO regulations and therefore it is common practice in the industry to store the rejected water in a holding tank onboard the vessel, or bypass the separation/filtration system during de-ballasting. Storing rejected water onboard a vessel requires a large capacity. For example, the total ballast water volume for a typical super tanker may be in the region of 200,000 tonnes. If the rejected water from the separation/filtration process is 1%, a storage or holding tank capacity of 2,000 tonnes will be required. If multiple de-ballasting cycles take place during one voyage, an enormous onboard storage capacity will be needed. This is not practical and inevitably results in a significant loss of cargo-carrying capacity.

According to certain embodiments of this invention, a secondary filtration system 24 is provided to solve the problem of rejected water storage. Particularly, rejected water produced from the primary filtration system during the de-ballasting process is sent to a secondary filtration system. In the secondary filtration system 24, the de-ballasting rejected water is further filtered such that the rejected water volume may be further reduced, e.g. by 99%. The balance of the rejected water after secondary filtration, e.g. 1%, has become significantly reduced in volume such that there is no issue storing it onboard the vessel. Based on the above example of a tanker with 200,000-tonne ballast water capacity, the final rejected water volume (after secondary filtration) will be 20 tonnes instead of 2000 tones (without secondary filtration). The foot print of this secondary filtration system 24 is also small as it is designed to filter 1% of the main ballast water flow rate which results in only 0.01% of rejected water. In certain vessels where there is no small tank available for storage of rejected water, the secondary filtration system 24 may still be installed, however the resulting concentrates from the secondary filtration process may be evaporated off and the remaining un-evaporated solid residues collected.

(b) Biofouling Control System

In certain embodiments of the invention, BFC units 14 are disposed in multiple strategic locations (see FIG. 1A) in the BWTS system, e.g. in filters, disinfection chambers and interconnecting piping system. In combination with the UV treatment, the BFC units 14 provide synergy control effect on organisms and also provide intermittent or continuous re-circulating cleansing to control the formation of biofilm and re-growth of the living organisms and bacteria within the ballast water system, particularly to the filtration system, to ensure no biological re-growth within the ballast water system even when ballasting or de-ballasting is not taking place. In certain embodiments, the BFC units 14 may be operational in the absence of ballasting and de-ballasting processes (i.e. re-circulation mode). In certain other embodiments, the BFC units 14 may also operate during de-ballasting process.

Each BFC unit 14 is adapted to provide an electromagnetic field or waves having an ultra-low time-varying frequency range to the ballast water. Particularly, the BFC unit 14 generates pulsed time-varying electromagnetic waves in an ultra-low frequency range which is capable of removing, killing or shocking marine organisms and bacteria, including biofilm, in ballast water when the electromagnetic waves are propagated through the ballast water. The electromagnetic waves may be adapted to excite parts of the ballast water treatment system (e.g. steel surfaces or grids of the primary filtration system and pipes fluidly connecting to or from various components of the ballast water treatment system where marine organisms and bacteria may attach themselves to, including but not limited to primary filtration system, disinfection chamber 20 and interconnecting piping system), and/or to create an "avalanche current" effect in the ballast water. This way, marine organisms and bacteria in the size range of 10 μm to 50 μm which subsist in the ballast water are removed, shocked or killed, and are prevented from adhering to surfaces in contact with the ballast water. It is to be appreciated that "avalanche current" is a self-sustained sharply increasing current pulse produced by the time-varying electromagnetic waves of BFC units 14. With the use of pulsed waves, the power requirements of these BFC units 14 are much lower compared to conventional UV systems for controlling marine organisms in the same size range.

In certain embodiments, the pulsed ultra-low frequencies may be generated within a range of 50 Hertz to 2,000,000 Hertz, preferably in the range of 50 Hertz to 200,000 Hertz. The pulsed peak-to-peak voltages may be within a range of 12 Volts (V) to 200 V (by oscilloscope). In certain embodiments, the ballast water treatment system may employ different desired frequency ranges suitably selected to control of marine organisms of different sizes. Particularly, the BFC units 14 may provide three different frequency ranges directed to control organisms having sizes greater than 50 μm, organisms having sizes between 10 μm to 50 μm, and bacteria.

The number of BFC units 14 and their combination of frequency ranges may be customized depending on water quality, loading on the UV system and the filtration units used in the primary filtration system. For example, if coarse filtration units are used to reduce the pressure drop within the primary filtration system due to existing ballast water pumping system constraints, the number of lower frequency range ("Type 3") BFC units 14 will be increased. If control of organisms in the size range of 10 μm to 50 μm is critical, the number of higher frequency range ("Type 2") BFC units 14 will be increased. For better bacteria control, if UV strength is reduced, the number of highest frequency range ("Type 1") BFC units 14 may be increased to enhance the bacteria control effect. Overall, BFC Types 3, 2 and 1 are capable of enhancing or complementing the multiple step primary filtration system and the UV disinfection system with significantly lower power consumption. Also, the use of these BFC units 14 allows cleaning of the metal surface without producing any disinfection by-products (DPB's).

Various means and methods of generating pulsed ultra-low frequency electromagnetic waves and propagating the same through ballast water may be appreciated from the existing art. Examples of BFC unit 14 are disclosed by International Patent Application No. PCT/SG2012/000302 filed on 28 Aug. 2012 or International Publication Number WO 2011/029222 published on 17 Mar. 2011 (under PCT/CN2009/073799). As disclosed in one embodiment, a BFC unit 14 may include a power supply, a generator for producing electromagnetic signals operating with desirable time-varying frequencies and means for oscillating and propagating the electromagnetic signals, which means comprises two or more spaced emitters submerged in water. In operation, an electromagnetic field is generated between the emitters and propagated from a vicinity of the emitters to the bulk water in the pipe to control living organisms in the water. As disclosed in another embodiment, a BFC unit 14 may include a power supply, a generator for producing electromagnetic signals operating with desirable frequencies and means for oscillating and propagating the electromagnetic signals, which means comprises a ferrite core antenna and a coil wound around the ferrite core submerged in water. In operation, an electromagnetic field is generated within and around the coil to control living organisms in the water. Other suitable means and methods for implementing a BFC unit 14 may also be known in the art or from the aforementioned patent applications.

(c) Disinfection System

Embodiments of the invention employ Light Emitting Diode (LED) UV lamp and/or Amalgam UV lamp for disinfection system in ballast water treatment.

In certain embodiments, the LED UV lamp may be arranged in conjunction with a reflector. Particularly, the LED UV lamp may be mounted at one end of a disinfection chamber 20. The LED UV lamp may be separated from the water chamber by quartz glass, laminated glass or other suitable materials. The water quality, especially the turbidity, determines the light penetration. In general, greater turbidity results in shorter penetration of light and therefore the depth of the water chamber depth are suitably dimensioned such that an effective dose of UV is able to reach all parts of the water in the chamber. Depending on the chamber size and water quality, the wattage or power rating of LED UV lamps to be employed are selected accordingly.

In certain other embodiments, the LED UV lamp is provided in a linear strip and without the reflector. The LED UV lamp in linear strip form may replace conventional UV tubes in the UV chamber. In certain applications where water is very turbid and it is hard for the reflector LED UV lamp to reach the full water mass, quartz tubes in various designed lengths can be configured to penetrate into the water mass for treatment to ensure sufficient UV dosage reaches all parts of the water.

In yet other embodiments, an Amalgam UV lamp may be used in combination with a LED UV lamp. While LED UV lamp is more energy efficient and has greater flexibility in shape and design, the cost of LED UV lamp per watt is much higher than Amalgam UV lamp. Therefore, both LED UV and Amalgam UV lamps can be used in combination to achieve the optimum treatment effect whilst maintaining overall cost effectiveness.

The LED UV and/or Amalgam UV lamps will produce UVA, UVB and UVC light with UV wavelengths ranging from 180 nm to 400 nm, however, only the UVC light is more effective in killing most species of bacteria. By having seawater and laminated glass in the disinfection chamber 20, which have higher selective ratios and are therefore able to remove UVA and UVB, a purer UVC light is emitted into the water.

Optionally, mechanical cleaning wipers or water jets may be incorporated to clean the external surface of the quartz sleeve or laminated glass sheet to ensure the light penetration efficiency is maintained.

Embodiments of the invention achieve certain advantages including, but not limited to, the following:

i. The ballast water treatment system applies similar basic treatment to ballasting and de-ballasting processes. By allowing the ballast water to pass through the same separation/filtration system/BFC/UV disinfection system during the de-ballasting process, treatment efficiency and water quality are enhanced, power consumption is significantly lower compared to conventional UV system, and the equipment footprint is also reduced.

ii. The ballast water treatment system does not use any chemicals and therefore does not negatively impact the environment.

iii. The ballast water treatment system is suitable for freshwater, seawater and brackish water iv. The use of secondary filtration system to treat rejected water from the primary filtration system significantly reduces volume of back wash water and allows the reduced back wash water to be stored onboard a ship without causing substantial loss of cargo-carrying capacity.

v. Use of LED UV lamps and/or Amalgam UV lamp in the disinfection system eliminates mercury pollution. LED UV lamps consume lower power as compared to conventional mercury vapour UV lamps. Also, the life span of LED UV lamps is much longer than conventional mercury vapour UV lamps thus resulting in lower OPEX. Further, LED UV lamps produce desirable ranges of UV spectrum which, when combined with the BFC units, results in very effective and efficient disinfection.

vi. Performance of the BFC units is not affected by water turbidity. BFC units also enhance the performance of the UV system in the event of high water turbidity. This allows a combination of BFC units and UV system to be applied in highly turbid water.

vii. Continuous or intermittent bio-fouling control treatment system which can be activated in offline or recirculation mode ensures consistent water quality even in the absence of ballasting and de-ballasting processes.

Other embodiments will be apparent to those skilled in the art from consideration of the specification and practice of the invention. Furthermore, certain terminology has been used for the purposes of descriptive clarity, and not to limit the disclosed embodiments of the invention. The embodiments and features described above should be considered exemplary, with the invention being defined by the appended claims.

The invention claimed is:

1. A ballast water treatment system suitable for ballasting and de-ballasting water on a ship or sea-going vessel, the system comprising:
a primary filtration system adapted to remove particles from a ballast water;
at least one biofouling control (BFC) unit;
at least one ultraviolet (UV) disinfection chamber;
wherein the at least one BFC unit comprises a power supply, a generator configured to generate a plurality of electromagnetic waves, and a propagation apparatus configured to propagate the plurality of electromagnetic waves, wherein the at least one BFC unit is adapted to generate and propagate through the ballast water the plurality of electromagnetic waves during a ballasting process for receiving the ballast water into a ballast tank on the ship or sea-going vessel and a de-ballasting process for discharging the ballast water from the ballast tank,
wherein the at least one UV disinfection chamber comprises at least one ultraviolet (UV) lamp adapted to irradiate filtered ballast water exiting the primary filtration system during the ballasting process and the de-ballasting process, wherein the at least one UV disinfection chamber is adapted to be inactivated during a re-circulation process taking place in an absence of both the ballasting process and the de-ballasting process;
a first pipe which fluidly connects the primary filtration system and the at least one UV disinfection chamber; and
a second pipe which fluidly connects the at least one UV disinfection chamber and the ballast tank;
wherein the at least one BFC unit is disposed at at least one of the first pipe and the second pipe,
wherein the ballast water treatment system is adapted such that, during the re-circulation process, holding water in ballast water pipes, including the first and the second pipe, is re-circulated intermittently or continuously through the primary filtration system and the at least one BFC unit, and
wherein the at least one BFC unit is adapted to at least intermittently generate and propagate through the ballast water the plurality of electromagnetic waves having pulsed peak-to-peak voltage, in a range of 12V to 200V, and at least one desired time-varying frequency range, which is within 50 Hz to 2,000,000 Hz, during the re-circulation process to continuously control multiplication of marine organisms in the ballast water and on a plurality of surfaces in contact with the ballast water, wherein the plurality of electromagnetic waves are adapted to produce an avalanche current in the ballast water to kill the marine organisms without requiring an active substance or chemical.

2. The system of claim 1, wherein the at least one UV lamp is a Light Emitting Diode (LED) UV lamp.

3. The system of claim 2, wherein the at least one UV disinfection chamber further comprises one of a quartz glass and a laminated glass separating the filtered ballast water from the LED UV lamp.

4. The system of claim 2, wherein the at least one UV disinfection chamber further comprises at least one Amalgam UV lamp.

5. The system of claim 1, wherein the at least one frequency range is within 50 Hz to 200,000 Hz.

6. The system of claim 1, wherein the at least one BFC unit comprises a plurality of BFC units adapted to generate the plurality of electromagnetic waves with different pulsed frequency ranges which are respectively selected to control multiplication of marine organisms with sizes greater than 50 μm, marine organisms with sizes between 10 μm to 50 μm, and bacteria.

7. The system of claim 1, further comprising a secondary filtration system which is adapted to receive rejected ballast water obtained from the primary filtration system during the de-ballasting process, the secondary filtration system is adapted to filter the rejected ballast water.

8. The system of claim 7, wherein the secondary filtration system is adapted to reduce a volume of the rejected ballast water by up to 99%.

9. The system of claim 1, wherein the propagation apparatus comprises two or more spaced emitters.

10. The system of claim 1, wherein the propagation apparatus comprises a ferrite core antenna and a coil wound around the ferrite core antenna.

11. A method of treating a ballast water onboard a ship or sea-going vessel, the method comprising:
passing the ballast water through a primary filtration system to remove particles from the ballast water;
during a ballasting process for receiving the ballast water into a ballast tank on the ship or sea-going vessel and a de-ballasting process for discharging the ballast water from the ballast tank, disinfecting filtered ballast water by a combination of ultraviolet (UV) light irradiation in a UV disinfection chamber and biofouling control which is provided by at least one biofouling control (BFC) unit generating and propagating a plurality of electromagnetic waves through the ballast water;
during the ballasting process, receiving disinfected ballast water into the ballast tank; and
during a re-circulation process taking place in an absence of the ballasting and the de-ballasting process, the ballast water in ballast water pipes, having a first and a second pipe, is re-circulated intermittently or continuously through the primary filtration system and the at least one BFC unit;
during the re-circulation process, inactivating UV light irradiation in the UV disinfection chamber, at least intermittently generating and propagating, by the at least one BFC unit, the plurality of electromagnetic waves having pulsed peak-to-peak voltage, in a range of 12V to 200V, and at least one desired time-varying frequency range, which is within 50 Hz to 2,000,000 Hz, through the ballast water to continuously control multiplication of marine organisms in the ballast water and on a plurality of surfaces in contact with the ballast water, wherein the at least one BFC unit is disposed at at least one of the first pipe which fluidly connects the primary filtration system and the UV disinfection chamber, and the second pipe which fluidly connects to or from the UV disinfection chamber and the ballast tank, the at least one BFC unit comprising a power supply, a generator configured to generate the plurality of electromagnetic waves, and a propagation apparatus configured to propagate the plurality of electromagnetic waves, and
producing, by the plurality of electromagnetic waves, an avalanche current in the ballast water and killing the marine organisms using the avalanche current without requiring an active substance or chemical.

12. The method of claim 11, wherein disinfecting the filtered ballast water by the UV light irradiation comprises providing the UV disinfection chamber and at least one Light Emitting Diode (LED) UV lamp in the UV disinfection chamber.

13. The method of claim 12, wherein providing the at least one Light Emitting Diode (LED) UV lamp comprises providing one of a quartz glass and a laminated glass separating the filtered ballast water from the at least one LED UV lamp, wherein the one of the quartz glass and the laminated glass is adapted to remove UVA and UVB light from the UV light irradiation.

14. The method of claim 12, wherein disinfecting the filtered ballast water by the UV light irradiation further comprises providing at least one Amalgam UV lamp in the UV disinfection chamber.

15. The method of claim 11, wherein generating the plurality of electromagnetic waves comprises generating the plurality of electromagnetic waves which are within a range of 50 Hz to 200,000 Hz.

16. The method of claim 11, wherein generating the plurality of electromagnetic waves further comprises generating the plurality of electromagnetic waves with different pulsed frequency ranges which are respectively selected to control multiplication of marine organisms with sizes greater than 50 μm, marine organisms with sizes between 10 μm to 50 μm, and bacteria.

17. The method of claim 11, further comprising:
during the de-ballasting process, after removing the particles from the ballast water by filtration, receiving rejected ballast water at a secondary filtration system, removing particles from the rejected ballast water by the secondary filtration system to reduce a volume of the rejected ballast water.

18. The method of claim 17, further comprising:
storing a final rejected ballast water discharged by the secondary filtration system, whose volume is 1% of the rejected ballast water entering the secondary filtration system.

* * * * *

UNITED STATES PATENT AND TRADEMARK OFFICE
CERTIFICATE OF CORRECTION

PATENT NO. : 10,457,570 B2
APPLICATION NO. : 14/424004
DATED : October 29, 2019
INVENTOR(S) : Sow Hong Kuik et al.

Page 1 of 1

It is certified that error appears in the above-identified patent and that said Letters Patent is hereby corrected as shown below:

On the Title Page

Under (30) Foreign Application Priority Data:
Please delete "201206460" and insert -- 201206460-6 --

Signed and Sealed this
Twenty-fourth Day of December, 2019

Andrei Iancu
*Director of the United States Patent and Trademark Office*